United States Patent [19]
Wahlbeck

[11] Patent Number: 4,902,342
[45] Date of Patent: Feb. 20, 1990

[54] METHOD FOR THE MANUFACTURE OF NON-ALLERGY CREATING PRECIOUS METAL OBJECTS

[76] Inventor: Hans G. E. Wahlbeck, S-150 32 Stallarholmen, Nybble, Sweden

[21] Appl. No.: 99,661

[22] Filed: Sep. 21, 1987

Related U.S. Application Data

[63] Continuation of Ser. No. 626,876, filed as PCT SE83/00371 on Oct. 28, 1983, published as WO84/01788 on May 10, 1984, abandoned.

[30] Foreign Application Priority Data

Oct. 29, 1982 [SE] Sweden .................................. 8206158

[51] Int. Cl.$^4$ .............................................. C22B 11/00
[52] U.S. Cl. ........................................ 75/83; 420/587; 420/588; 420/589; 420/590
[58] Field of Search .................... 75/83; 420/587, 588, 420/589, 590

[56] References Cited

U.S. PATENT DOCUMENTS

3,613,209 10/1971 Piquerez .............................. 148/430

Primary Examiner—Melvyn J. Andrews
Attorney, Agent, or Firm—James E. Nilles

[57] ABSTRACT

A method and an apparatus for the manufacture of non-allergy creating objects, especially objects of metal for direct contact with the skin of a human body, for instance jewelery, watches, glasses etc. whereby completely pure metals, especially precious metals like gold, silver, platinum, palladium, rodium etc. are alloyed with optimum pure zinc, copper, aluminum, nickel or chrome, and whereby any and all treatments both in hot and cold stage are made without access of air and without any contact with extraneous substances like salts or acids. Preferably all melting and heating is made under a protective gas. An apparatus for executing the method according to the invention may comprise a movable table (61) for advancing a cold worked object (66) through a heating channel in counter current to a heating gas or a protective gas (70), and in which the heating channel (63) is directly connected to a cooling channel (68) which makes use of the exhaust gases from the heating channel (71, 73) as cooling and protective gas during the cooling operation, whereby the advancing of the object (66) through the cooling channel is made concurrently with the flow of cooling and protective gas.

4 Claims, 4 Drawing Sheets

METHOD FOR THE MANUFACTURE OF NON-ALLERGY CREATING PRECIOUS METAL OBJECTS

This application is a continuation, of application Ser. No. 626,876, filed as PCT SE83/00371 on Oct. 28, 1983, published as WO84/01788 on May 10, 1984, now abandoned.

The present invention relates to a method and an apparatus for the manufacture of non-allergenic creating objects of precious metals. By precious metal objects are meant any type of objects which are completely or partly made of a precious metal or a precious metal alloy, and the invention is especially concerned with such objects which are supposed to get in contact with the skin of a human body, for instance finger rings, bracelets, jewel chains, brooches, amulets, earrings, watches, glasses and sun-glasses etc. The precious metal may be gold, silver, platina, rodium, palladium and other precious metals suited for the manufacture of the above mentioned objects. The precious metals may be solid or may be in the form of double or any other surface covering of some less precious metal like copper, zinc, aluminum, tin or chrome or nickel or any alloy of such metals. According to the invention the object also may be made as a whole of these non-precious metals.

It is known that many people are hit by different kinds of illness conditions at skin contact with jewels, watches, glasses and many other objects made of the said metals. Special troublesome phenomena may appear when the said objects get in contact with very thin skin with high transmittance ability like for instance rings, especially earrings applied through holes in the ear tip. The illness conditions generally are skin troubles like itching, scorching, eryphema, exanthena, liquid containing blisters or suppuration boils. In addition to such skin troubles more intense illness conditions may appear.

Tests have proven that the said illness conditions which generally are referred to as allergic affections do not appear if the object in contact with the human skin is made of optimum pure and clean metals of gold, silver, (platinum), rodium, palladium etc. not even if the said metals have been alloyed with optimum pure and clean copper, zinc or tin or even aluminum, nickel or chrome. There are reasons to believe that the said allergic affections depend on impurities in the metals or the metal alloys. It may be assumed that some alloy substances cause serious allergic affections, like for instance alloyed heavy metals like cadmium, lead, mercury, bismuth, antimony, cobalt, etc. Allergic affections also may appear if impure alloy metals are used like impure copper, zinc, tin or any other impure alloy metals. Impurities may appear both when manufacturing the precious metal or the precious metal alloy itself or during the working and the following treatment of the metal or the metal alloy. For instance impurities may be added in the precious metal, the alloy metal or the alloy if treated with an acid during the manufacture or the subsequent treatment. Copper has a great tendency of assimilating many different types of impurities. Without the risk of the appearance of allergic problems, optimum pur and clean copper, optimum pure zinc, optimum pure tin and possibly even optimum pure aluminum, chrome or nickel and other metals may be used as alloy metals. On the contrary it is of great importance that most types of heavy metals and thereby related or similar metals like cadmium, lead, mercury, bismuth, antimony, cobalt etc. are completely excluded from the alloy.

It is also of importance to eliminate the impurities and any further metals or any other allergy creating substances in the base metal of objects covered with precious metals, so called double objects or objects coated in any other way. All metals or more or less "leaky", and by metal transient movements heavy metals and impurities and other allergy creating substances in the base of a double object or an object coated in any other way may be released from said base and may move through the precious metal layer and dispose as a surface covering of the object. By the invention it has also been shown that, for instance, cadmium has a great tendency for such metal transient movement. Cadmium alloyed objects therefore generally get a more or less thin surface covering of the allergy creating heavy metal cadmium.

In the manufacture of objects of non-alloyed precious metals or precious metals alloyed with optimum pure alloy metals like copper, zinc, tin and even chromium or nickel, there often arise manufacturing technical problems.

As an example, silver in combination with copper has a so-called shape memory, and as a consequence when heat treating a cold worked silver object the object tends to regain the form that the silver object had before the cold working. Such shape memory causes large problems for instance when soldering the objects in that the joints opens when the objects is heated and there is a risk of bad soldering. In order to neutralize the shape memory of the silve and to make the silver shape willing, cadmium generally is added to the silver. Often an addition of more than 7% cadmium was needed in order to obtain the intended effect. When adding cadmium to the silver, a brittle soldering joint is obtained. An addition of cadmium in a silver alloy however, gives serious allergy problems. Equivalent problems appear when manufacturing objects of gold, (platinum), palladium, rodium and other precious metals as well as when manufacturing objects of copper, zinc, aluminum, tin and even nickel or chrome or alloys like brass or tombak.

When performing stress-relieving annealing, salts generally are used, so-called hardening salts. The salts may be hot or cold. For the purpose of cooling the metals in connection to stress-relieving annealing water mixed with certain salts often is used for raising the evaporating temperature. Also, such salts may cause allergic affections, and it is also important to foresee that the metal object does not get in contact with such salts.

The object of the invention therefore is to solve the problem of providing a method and an apparatus for manufacturing of objects of pure metals, especially precious metal alloys or alloys of pure precious metals and optimum pure alloy metals like copper, zinc, aluminum, tin, chrome, nickel, etc.

So far it has not been considered possible to manufacture objects of such pure metals and pure metal alloys depending of the above mentioned manufacturing problems. Surprisingly it has, however, proved that it is no only possible to use such pure metals but by special working metals and the use of special apparatus for working the metals and the metal objects it is even possible to obtain objects without any noticable shape memory and having a rupture strength which is even higher than for previously known metals or metal alloys which are alloyed with cadmium or other heavy metals, in which the alloys include impure precious metals or alloy metals. By the method and the apparatus according to the invention it is also possible to obtain soldering joints wich are more tenacious and have a substantially higher rupture strength than the joints which are obtained in objects made of cadmium containing alloys.

The method and the apparatus according to the invention are based on the presumption that optimum pure metals are used, which metals are mixed, alloyed and worked in heated condition without any contact with the ambient air.

In the method according to the invention only optimum pure metals such as precious metals like gold, silver, platium, palladium, rodium etc. and alloy metals like optimum pure copper, zinc, aluminum, tin and even nickel and chrome are melted and alloyed. In order to make such that the metals are real optimum pure, some reduction agent may be added for absorbing possible impurities. The said reduction agent becomes a slag layer on the surface of the melted metal, which slag layer prevents the air from get into contact with the metal. Further the metal is preferably molded under a protective gas and under the said reducing slag layer in order to prevent oxidization. The blank thereby obtained is cold worked and is stress-relieving annealed, likewise without any contact with the air, and the metal is cooled without the contact of external agents, for instance without the contact with salts. Rather than using so-called hardening salts for cooling purposes any of the following substances may be used: Optimum purified water (deionized water), optimum purified alcohol, a mixture of purified water and purified alcohol. Independently of what mixture is used the purity must be at least $0,1 \, \mu s/cm^2$.

The stress-relieving annealing must be done under protective gas or otherwise so that the access of air is prevented. Soldering and other further heat treating also must take place without the access of air, and as a final product an object is obtained which is made of pure metals, especially pure precious metals and pure alloy metals, which objects may be considered completely non-allergic.

Now the method and the apparatus is to be described in connection to a number of method stages and with reference to the accompanying drawings.

It is, however, to be understood that the method and the apparatus according to the invention is not restricted to the following description and that the embodiments of the invention shown in the drawings are only an exemplifying character and that many different modifications may be presented within the scope of the appended claims.

1. MELTING STEP

The most important feature of the invention is that optimum pure metals are used and that the total working of the metal or the metal alloy is made so that no impurities are added during the working. As jewel metals are in a first hand considered gold, silver, (platinum), palladium, rodium and other precious metals which may have been alloyed to each other or to alloy metals, in the first hand copper, zinc or tin but even aluminum, nickel and chrome. All alloy metals must be optimum pure and not in any way treated in the surface. Previously it was considered desirable or necessary that some types of heavy metals or similar material was to be added, for instance, cadmium, lead, mercury, bismuth, antimony or cobalt. According to the invention it is, however, of extreme importance that no such heavy metals are allowed to be mixed into the metals or metal alloys, neither during the melting together of the metals or during the continued treatment. In order to make sure that no impurities remain in the melted metal or are added during the melting operation a slight amount of some reduction agent is added, which agent absorbs such possible impurities and provides a slag layer, which is kept on the surface of the melted metal. A suitable reduction agent in the form of a melting powder having an excellent property to force impurities out of the melted metal is a mixtur of one part of potassium carbonate and 1.5 part of waterfree sodium carbonate. The slag layer thereby obtained also has the important purpose of preventing the access of air during the continued melting and cooling of metals. The melting together of the metals is made without any access of air, for instance in that a protective gas is continuously blown over the metal surface or that the melting is made by means of a flame which covers the entire surface and prevents the access of air. It is also possible to make use of the supply of protective gas and a covering flame.

Figures 1, 2:
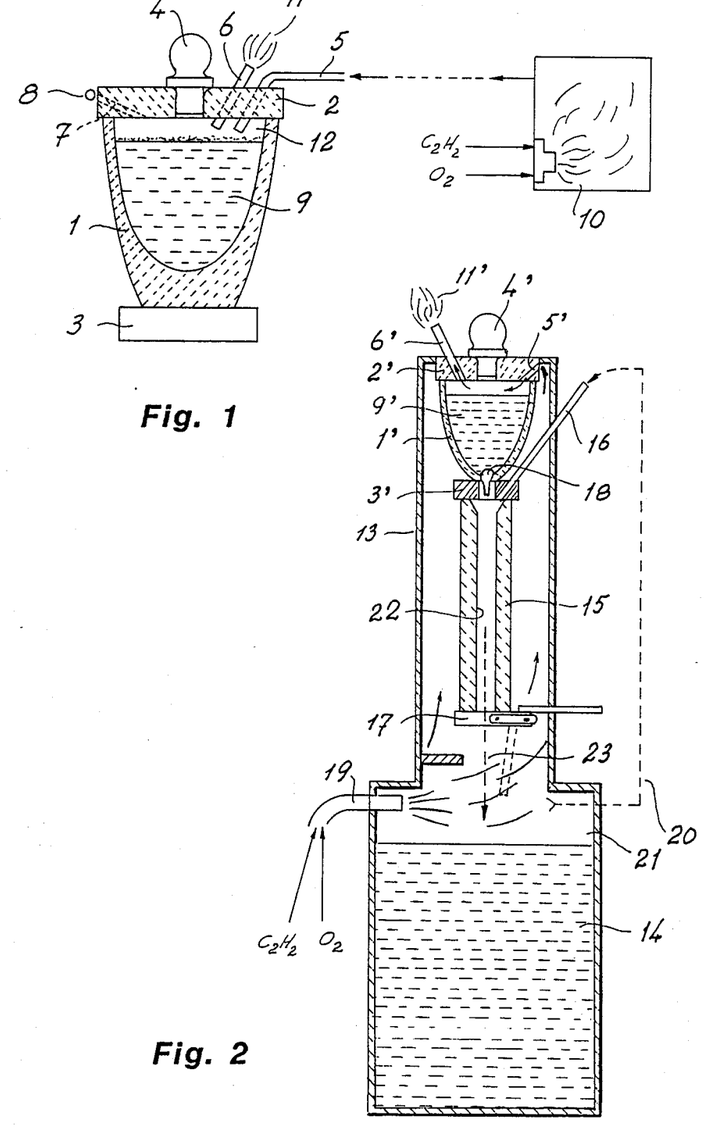
FIG. 1 shows an apparatus for melting of metals in accordance with the invention.
FIG. 2 shows a combined apparatus for melting of metals and for molding and cooling of a molded metal rod.

In FIG. 1 shows a crucible, especially a graphite crucible 1 having a lid 2 which is connected to a positive pole of current and having a bottom 3, which is connected to a negative pole of current. The crucible also may have an alternative current heating. The lid is closed by a stopper 4. In the lid or any other high position of the crucible there is also a gas inlet 5 for protective gas and an outlet 6 for the protective gas. Further there is a spout 7 in the lid which is closed by a spout stopper 8. In the crucible there is melted metal 9, which is heated electrically in that the current is brought to pass the graphite crucible from the positive lid 2 to the negative bottom 3.

It is important that the metal is melted without access of air, and in the described embodiment this is done in that the air is forced out and is substituted by protective gas which enters from the gas inlet 5 and fills the entire volume above the surface of the melted metal 9 and leaves through the gas outlet 6.

A suitable protective gas is obtained by burning waterfree acetylene gas or methane gas together with a controlled amount of waterfree pure oxygen in a combustion chamber 10. Instead of using pure oxygen waterfree compressed air may be used. In this case he purity is slightLy less and the heating follows more slowly depending on the cooling effect of the nitorgen gas component. The combustion is made with deficit of oxygen and the amount of oxygen is controlled so that the exhaust gas outlet at the gas outlet 6 contains uncombusted gases which may be lighted, whereby a very thin blue colored flame 11 appears. By this method an atmosphere is created inside the combustion chamber and thereby also inside the gas volume 12 above the surface of the melted metal 9, which volume is absolutely free from oxygen, hydrogen or nitrogen gas.

A productive gas of the above-mentioned type can be used in all conditions during heat treatment of the metal object. When melting metal under atmospheric pressure as shown in FIG. 1, the entire gas volume 12 of the crucible is precolated by the combustible exhaust gas from the combustion chamber 10 and the surface of the melted metal 9 is continuously spray washed with the said combustible exhaust gas. If on the contrary, the melting and the molding is made under vacuum all gas volumes firstly must be precolated by the combustible exhaust gas or protective gas, and not until the gas volume has been precolated the volumes are subjected to vacuum.

2. MOLDING STEP

The melted metal or the metal alloy is molded into blanks without access of air, preferably under protective gas underneath the reducing slag layer for preventing oxidization. The molding of melted metal can be made in a mold, for instance a tube which is preferably rubbed with oil. The entire tube is surrounded by a flame or a protective gas which prevents the access of air. The melted metal evaporizes the oil on the walls of the tube, and also the oil gases thereby obtained provide a protective gas which conributes to protecting of the metal against access of air. As oil for the mold tube peviously used were animal oils like lard fat, etc. Also, castor-oil or asphalt based oils have been used. The castor oil, however, quickly turns rancid, and aspahlt based oils, in turn, give harmful effects. According to the invention it is suggested to use a paraffin based oil which gives a well protecting, inert protective gas layer and which has no harmful influence on the continued treatment of the metal. A blank molded under paraffin based oil exhaust gases gets very good soldering joints during the continued treatment.

FIG. 2 shows a combined apparatus for melting and molding of metal under vacuum. The apparatus comprises a carrier 13 which at the bottom contains a cooling liquid 14 of the previously described type and which above the level of the cooling liquid carries a mold, for instance a mold tube 15, which at the top has a inlet 16 for protecting gas and at the bottom has a drop shutter 17 for letting the molding metal out. On top of the mold tube 15 a mold crucible of the same type as in FIG. 1 is placed. The mold crucible 1' in which the melted metal 9' is heated has a gas inlet 5' and a gas outlet 6' for the exhausted protective gas. At the top the mold is closed by a stopper 4', and at the bottom the crucible has a pouring spout which is closed by a spout stopper 18. The carrier 13 encloses the entire apparatus as an air sealed unit. Between the level of the cooling liquid 14 and the mold tube 15, there is an inlet 19 for combustion gas and oxygen which inside the carrier is combusted under deficit of oxygen thereby providing a protective gas. The protective gas precolates the entire carrier between the mold tube 15 and the carrier walls, and the protective gas also flows into the gas inlet 15 of the crucible 1' and out through the gas outlet 6' whereby the gas is lightened, whereby the weak blue flame indicates the decifit of oxygen of the protective gas inside the apparatus.

When using the apparatus in FIG. 2, the crucible 1' is closed by means of the spout stopper 18' and metal and possible reduction agent is filled into the crucible. Combustible gas and oxygen is supplied through the gas inlet 19, and the protective gas is allowed to force the air out of the equipment. The lid 2' and the bottom 3' of the crucible 1' are connected to a source of power, thereby the metal and the reduction agent are melted. At this stage the drop shutter 17 is kept open and protective gas, which may be supplied from a branch conduit 20 to the protective gas chamber 21 is blown through the gas inlet to the mold tube 15, whereby the protective gas forces the air out of the tube. As usual the channel of the mold tube 15 should be conically widened in the direction downwards in order to facilitate the releasing of the mold blank from the mold 15.

3. MOLDING STEP

When the metal 9' is melted the drop shutter 17 is closed, and the gas inlet 16 now is connected to a vacuum pump which sucks the protective gas out of the mold chamber 22 of the mold tube 15. The pouring spout 18 of the crucible is lifted and the melted metal 9' is allowed to flow down into the mold chamber 22, in which the melted metal rapidly becomes solidified. Immediately the metal has become solidified the drop shutter 17 is reopened and the mold tube 15 together with the mold blank is let down as indicated with the dotted line 23. After some distance of free fall the mold 15 hits a stop bar as shown in FIG. 2. Thereby the mold gets a shock so that the blank 23 is released and drops down in the cooling liquid 14. After the molded bar has been cooled it is ready to be taken out for possible further working.

Figures 3, 4:
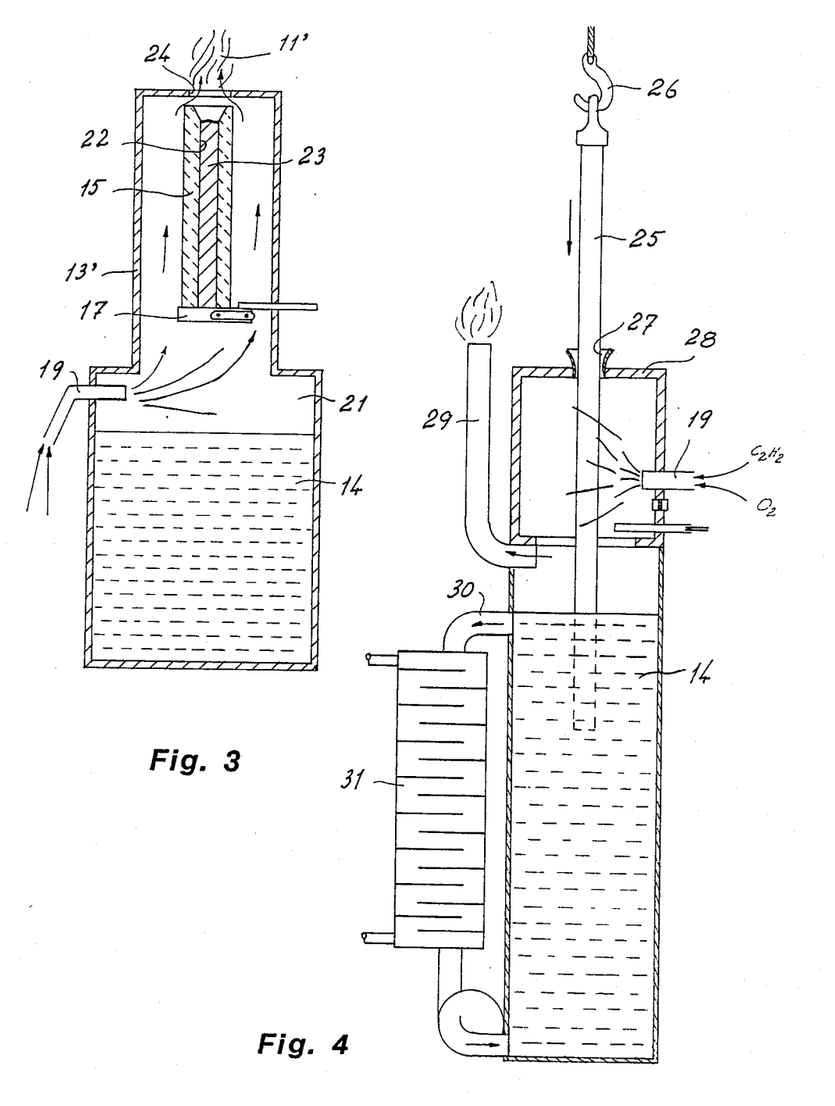
FIG. 3 shows an apparatus for molding of melted metal according to the invention.
FIG. 4 shows an apparatus for stress-relieving annealing of a rod.

FIG. 3 shows an alternative equipment for molding of metal, which preferably may be combined with the crucible shown in FIG. 1. In this case the upper portion of the carrier 13 has an opening 24 through which protective gas flows from the protective gas chamber 21 and through the annular channel between the mold tube 15 and the carrier 13'. The protective gas leaving the opening 24 is lightened thereby giving the above mentioned thin blue flame 11' which indicates deficit of oxygen of the protective gas inside the carrier 13'. For molding of a metal bar the crucible in FIG. 1 is tilted so that the spout 7 with the spout stopper 8 comes within the area of the gas flame 11', whereby air is prevented to come into contact with the molten metal. Molding and cooling otherwise is made as explained in connection to FIG. 2.

4. STRESS-RELIEVING ANNEAL STEP

After an object like a bar or a wire is molded the object is to become stress-relieving annealed.

In FIG. 4 an apparatus for stress-relieving annealing. is shown of a bar 25 in an apparatus which in substantial parts coincides with the apparatus of FIG. 3. The bar 25 is carried in a vertically reciprocatable hook 26 and can be let down through an opening in a closed refractory furnace 28, in which the form and size of the opening 27 closely coincides with the form and size of the bar 25. The furnace 28 has one or more inlets 19 for combustible gas and oxygen at some central portion of the furnace, and in the lower part of the furnace there is a chimney or an outlet 29 for exiting protective gas. At the bottom of the refractory furnace 28 cooling liquid 14 is provided which liquid preferably over a branch conduit 30 and a heat exchanger 31 is cooled and recirculated. Hot cooling liquid is removed at the upper portion of the cooling liquid chamber and chilled liquid enters at the bottom of the chamber. The bar 25 is stress-relieving annealed and is successively let down in the cooling liquid 14.

Figures 5, 6:
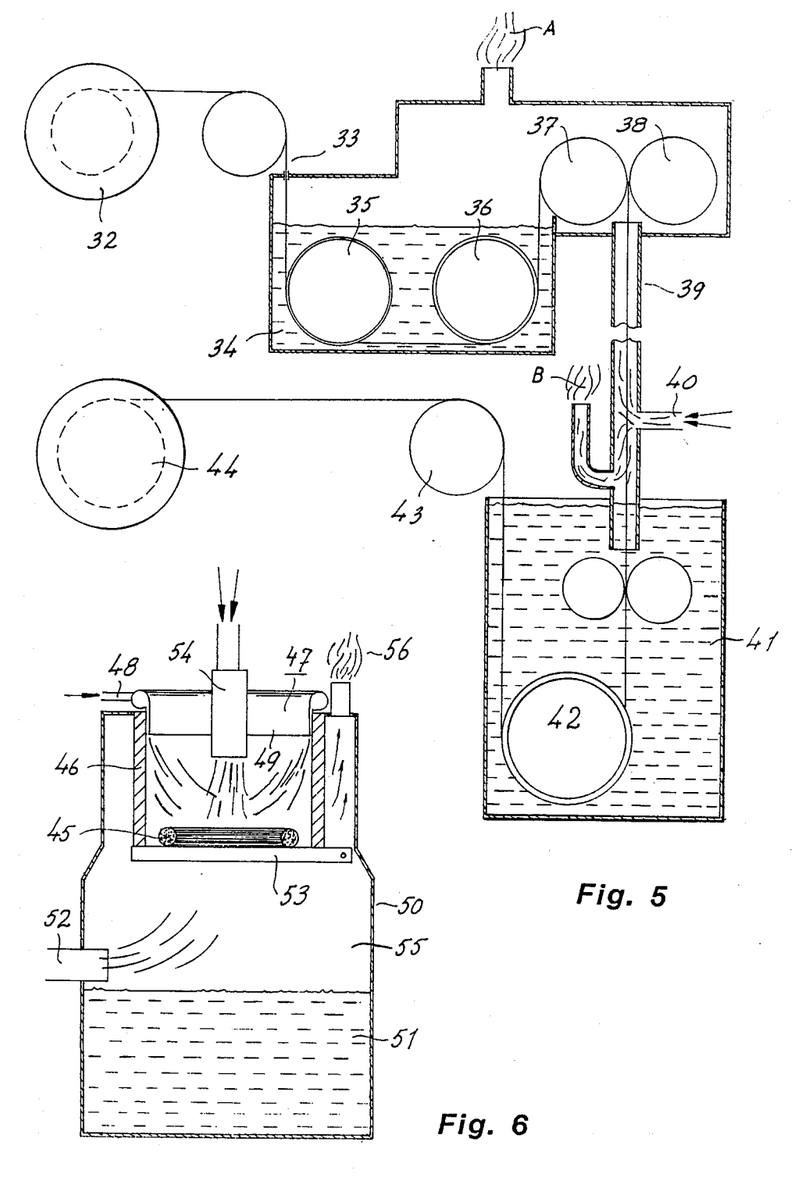
FIG. 5 shows an apparatus for annealing of a non-allergic creating metal wire.
FIG. 6 shows another apparatus for stress-relieving annealing of a wound ring of metal wire.

FIG. 5 shows an apparatus for stress-relieving annealing of a wire without access of air. From a supply roller 32 a wire 33 passes over a pulley and enters a de-ionized water bath 34 in which the wire moves at last in two turns over an idle running contact roller 35 of copper, graphite or carbon or similar material. By means of a driving roller 36 the wire is fed from the water bath and into the area of a synchronously driven guide roller 37 and an idle running roller 38 which are provided at the upper portion of a protective gas channel 39. At the lower part of the protective gas channel 39 there is an inlet 40 for combustible gas and oxygen, and at the lower part of the protective gas channel there is also connected another waterbath 41 for de-ionized water and having a purity, which like the purity of the water bath 34 is less than 0.1 $\mu s/cm^2$. If necessary, the two water baths 34 and 41 may contain some non-allergy creating conductive salt for providing a spark blow-out. In the lower waterbath 41 the wire is driven between two guide rollers and at last two turns round a driving, speed controlling contact roller 42 of copper, graphite, carbon or a similar alternative material. From the contact roller 42 the wire is fed to a winding roller 44 over a pulley 43. Between the two contact rollers 35 and 42 a current is fed. The current heats the wire to a suitable temperature for stress-releaving anneal, and the annealing is made while the wire passes through the protective gas channel 39 in which the protective gas entering the gas inlet 40 prevents the access of air.

If it is desired to prevent water steam from mixing with the protective gas in the channel 39, a main gas outlet B is provided at or adjacent the surface of the cooling bath, and only a minor portion of the exhaust gas is allowed to pass the channel 39 and to leave through the top outlet A.

FIG. 6 shows an alternative embodiment for stress-releaving annealing of a ring 45 of wound wire. In this case the annealing is made in an open container 46 of a refractory material which at the top is formed with an annular tube 47 having an inlet 48 for protective gas. The circular tube 47 is formed with a downwards extending annular wall 49 providing a downwards directed curtain of protective gas entering the container 46. The container 46 is mounted in an outer container 50 under gas sealed conditions. In the bottom of the outer container 50 there is a cooling bath 51 and on a level above the surface of the cooling bath there is an inlet 52 for protective gas. The inner container 46 is formed with a drop shutter 53 by which the wire ring 45 is supported. The heating of the wire ring to stress-relieving annealing temperature is providing by a manually or mechanically controlled burner 54 which is facing the bottom of the container 46 and the wire ring 45. From the protective gas chamber 55 above the water bath 51 protective gas leaves thrugh a gas outlet 56 at the top of the outer container 50, and the protective gas together with a combustible gas from the inner part of the inner container 46 leaves in the direction upwards through the open container thereby preventing air from entering the container. The exhaust gas from the outlet 56 may be guided to the inlet 48 and may be used for the protective gas curtain from the gas ring 47. After stress-releaving anneal of the wire ring 46 the drop shutter 53 is opened and the wire ring 45 is let down inthe cooling bath 51.

5. COLD WORKING

The blank provided according to the invention may be a bar, a wire or any other object, and said blank is cold worked to any wanted shape. The cold working does not necessitate any particular handling and is made in the conventional way in the air.

6. SOLDERING STEP

In most cases the continued treatment involves soldering of the blank, and for facilitating the continued handling and to prevent joints from opening when subjected to soldering heating the blank is stress-relieving annealed in the above described way. As mentioned the stress-relieving anneal is made without access of air and without contact wity any external substances. It should be noted that the stress-relieving annealing previously was made in a heated salt bath, but according to the invention it is important that the stress-relieving annealing is done without any contact with such salts.

When soldering the cold worked and stress-relieving annealed object, for instance a chain, solder is applied in the joints of the chain and the chain is heated until the solder melts and interconnect the ends of the joint. Soldering can be made by means of the apparatus shown in FIG. 6, whereby the wire ring 45 is substituted by the object or objects to be soldered, and immediately after soldering temperature has been reached and the solder has melted in the joints the drop shutter 53 is opened and the soldered objects are let down in the cooling bath 51. Also in connection to soldering it is important that the air is prevented from getting into contact with the hot objects, and this is effectively prevented in the apparatus according to FIG. 1. In this apparatus it is possible to provide a discontinuous soldering of long chains, whereby the chain is successively and stepwise fed down in the heating chamber under the gas curtain 49 and the burner 54, and correspondingly the chain is stepwise let down in the cooling bath 51.

Figure 7:
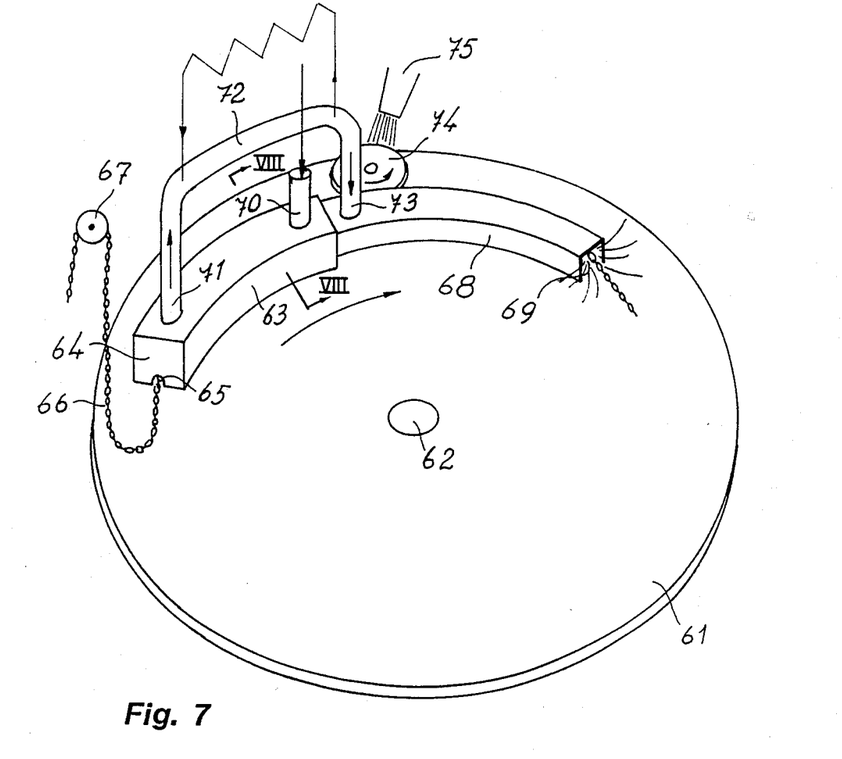
FIG. 7 shows an apparatus for soldering of a metal chain according to the invention.
Figure 8:
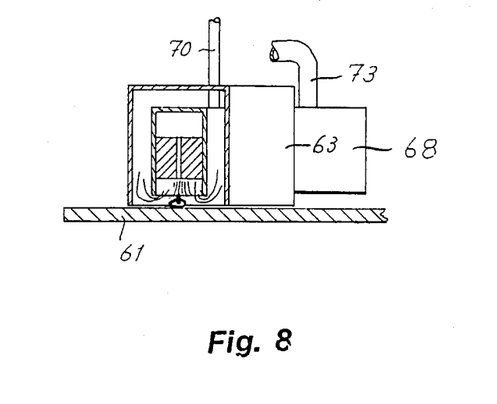
FIG. 8 is a cross section along line VIII—VIII of FIG. 7.

An apparatus suited for continuous soldering is shown in FIG. 7. The apparatus comprises a movable table like for instance a circular table 61 which rotates at a controlled speed around a shaft 62. At or adjacent the periphery of the table there is a heating channel 63 which is substantially sealed towards the table 61. At the inlet end 64 the heating channel 63 has a small opening 65 for entering of an object to be stress-relieving annealed or to be soldered for instance a chain 66, which over a pully 67 is continuously fed down on the table. At the outlet end the heating channel 63 is directly connected to a cooling channel 68, which preferably has smaller dimensions than the heating channel 63. The outlet hole (not shown) at the outlet end of the heating channel 63 is like the inlet hole 65 of small dimension for reasons which will be explained in the following. The cooling channel 68 should have such length that the treated objects, for instance the chain 66, has a temperature when leaving the cooling channel 68 which is substantially less than the oxidization temperature. The outlet hole 69 of the cooling channel 68 is large. For heating of the chain the heating channel 63 has two tube connections, viz. a connection 70 at the outlet end of the heating channel 68 for supply of combustible gas and some amount of oxygen and a second connection 71 at the inlet end of the heating channel 63 for removal of exhaust gases. Over a conduit 72 the exhaust gas connection 71 is directly connected to a connection 73 at the inlet end of the cooling channel 68. The exhaust gases from the exhaust gas outlet 71 are thereby directly fed to an exhaust gas inlet of the cooling channel, while being successively cooled the exhaust gases pass through the cooling channel 68 and leave through the large outlet hole 69. Since the heating channel 63 has a small inlet opening 65 and a small outlet opening, the largest portion of the exhaust gases are transmitted from the exhaust gas outlet 71 from the heating channel 63 to the gas cooling inlet 73 of the cooling channel 68.

It may be considered necessary to cool the exhaust gases while moving from the exhaust gas outlet 71 to the exhaust gas inlet 73, and therefore a cooling equipment as diagrammatically indicated in FIG. 7 can be interconnected between the connections 71 and 73.

As evident the combustion gas flow in counter current to the moving direction of the chain 66, and the chain thereby is successively heated during the movement from the inlet end 64 to the outlet end. The highest heat is reached adjacent the outlet end at which the solder should be completely melted.

A stretching of the chain may cause the links to open and for avoiding such stretching of the chain a pusher roller 74 is provided at the inlet end of the cooling channel 68. The pusher roller 74 extends through the wall of the cooling channel 68 and is placed so as to be in some contact with the chain. The pusher roller 74 rotates with a peripheral speed which is slightly less than the moving speed of the chain on the table 61, and the roller 74 thereby pushes the links into each other. This both prevents a stretching of the links and an opening of the soldering space with the subsequent risk for bad soldering and also prevents two links from being soldered to each other, so called stiff soldering. Preferably the pusher roller 74 is cooled, for instance by a fan 75 and the pusher roller thereby also contributes to a quick cooling of the chain 66.

The exhaust gases from the inlet 70 for combustible gases and oxygene are successively cooled during the passage through the heating channel 63, through the connection conduit 72 and through the cooling channel 68, and the chain is successively cooled by said gases while passing through the cooling channel. The exhaust gases provide an effective protective gas preventing the access of air both to the heating channel 63 and to the cooling channel 68. By the described apparatus the stress-relieving annealing and the soldering respectively, is made without access of air.

For facilitating the soldering a fluxing material may be let into the soldering chamber together with the protective gas or the heating gas. The soldering of course also can be done in that the chain is moved in an atmosphere of protective gas and in that a soldering flame is directed to the chain while passing the said flame. As soon as the part of the chain to be soldered has passed the soldering flame the said plate is surrounded by the protective gas which prevents the air from getting into contact with the chain and thereby prevents the metal from oxidizing and for assimilating impurities which later may cause allergic affections.

After an object has been manufactured, polishing may be necessary. According to the invention it is not suitable that the metal gets in contact with strange substances like waxes and the like during polishing. The surface cleaning and the polishing rather can be carried out in vibrating rubber containers filled with small parts of steel having a suitable shape and size for providing a mechanical cleaning and polishing of the manufactured product. For coarse polishing de-ionized water or pure alcohol or a mixture o the two liquids can be used. Both liquids must have a purity of at least 0.1 $\mu s/cm^2$, and there may be an addition of powdered optimum pure chalk or a similar material.

After the coarse polishing a fine polishing must be made in the same vibrator and in the same de-ionized liquid bath and with a non-allergy creating fine polishing addition.

A final surface covering may be provided by galvanic plating based solely on a technique using potassium cyanide.

The chemicals of the potassium cyanide bath likewise must be made of optimum pure metal salts and must be continuously filtered and purified by means of carbon filter or a corresponding purifying means, and the bath must be protected against any addition of foreign substances in that the bath is hermetically closed. It is not allowed to add any potassium chloride of any type to the bath, nor any acids or acid treated products may be added. The galvanic process must under no circumstances be speeded up by a too large flow of current. In case there is a risk that a dialysis starts which in turn starts production of oxygen and nitrogen gases this must be avoided.

After the product is coated according to the galvanic process, the product is once again fine polished in vibrating equipment as previously explained. Any surface polishing should be made in a bath which prevents the air from entering. In all surface polishing there is friction heating, whereby the ability of the metal to assimilate impurities is increased. The pure bath prevents such assimilation of impurities.

To the galvanic bath it is not allowed to add any other conductive salts than optimum pure potassium cyanide and optimum pure potassium cyanide based metal salts. The concentration of the potassium cyanide and the metal salts of potassium cyanide should be on the lowest possible level.

It should be noted that only pure carbon or graphite is allowed to be used as an anode for a gold bath. The gold bath should be exchanged every day or otherwise when consumed to a substantial part. As an anode for a silver bath it is only allowed to use pure silver made according to the above description. The silver anodes must not be kept in the bath for a longer time than necessary for maintaining the balance of the silver content. An object manufactured according to the above described method and by the above described apparatus contains just completely pure metals and has been manufactured without the addition of any impurities and otherwise allergy creating substances. Several yearts of tests have proved that objects manufactured according to the described method and apparatus have not in any case given the user allergic affections or other skin diseases.

I claim:

1. A method for manufacturing a non-allergenic metal object which can be safely worn next to the skin, comprising the steps of:
    (i) providing an optimum pure starting material selected from the group consisting of pure noble metals and optimum pure noble-metal alloys;
    (ii) creating a protective atmosphere, at atmospheric pressure, and consisting of water-free hydrocarbons incompletely combusted with pure oxygen and free of oxygen, hydrogen, nitrogen and nitrogen oxides;

(iii) melting said starting material in said protective atmosphere;

(iv) molding a molded object from said starting material in said protective atmosphere; and (v) solidifying and cooling said molded object in said protective atmosphere.

2. The method of claim 1 including the step of including a reduction agent in the melted starting material which absorbs impurities therefrom and provides a layer of slag on the surface of the melted starting material to exclude air.

3. The method of claim 1, wherein said starting material is an optimum pure precious metal selected from the group consisting of gold, silver, platinum, palladium and rhodium.

4. The method of claim 3, wherein said starting material is an optimum pure alloy comprising said precious metal and a non-precious metal selected from the group consisting of zinc, copper, tin, aluminum, nickel, and chromium.

* * * * *